United States Patent
Freimuth et al.

(10) Patent No.: US 10,616,374 B2
(45) Date of Patent: Apr. 7, 2020

(54) CLIENT ATTACHMENT TO AN OVERLAY NETWORK

(71) Applicant: INTERNATIONAL BUSINESS MACHINES CORPORATION, Armonk, NY (US)

(72) Inventors: Douglas M. Freimuth, New York, NY (US); Dilip D. Kandlur, Yorktown Heights, NY (US); Franck T. Le, White Plains, NY (US); Christian Makaya, Summit, NJ (US); Erich M. Nahum, New York, NY (US); Maroun Touma, Redding, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 226 days.

(21) Appl. No.: 15/458,570

(22) Filed: Mar. 14, 2017

(65) Prior Publication Data
US 2018/0270330 A1    Sep. 20, 2018

(51) Int. Cl.
*H04L 12/721* (2013.01)
*H04L 29/06* (2006.01)
*H04W 4/021* (2018.01)

(52) U.S. Cl.
CPC ............. *H04L 67/42* (2013.01); *H04L 69/24* (2013.01); *H04W 4/021* (2013.01); *H04L 45/124* (2013.01)

(58) Field of Classification Search
CPC ..... H04L 67/42; H04L 45/124; H04L 41/127; H04W 4/021

USPC ......................................................... 709/223
See application file for complete search history.

(56) References Cited

U.S. PATENT DOCUMENTS

| | | |
|---|---|---|
| 7,185,077 B1 | 2/2007 | O'Toole et al. |
| 7,742,485 B2 | 6/2010 | Zhang |
| 7,991,852 B2 | 8/2011 | Bu et al. |
| 8,087,025 B1 | 12/2011 | Graupner |
| 8,935,275 B2 | 1/2015 | Rathod |
| 2010/0251329 A1 | 9/2010 | Wei |
| 2016/0294615 A1 | 10/2016 | Fiorone et al. |
| 2018/0316600 A1* | 11/2018 | Renard ................. H04L 45/125 |

* cited by examiner

*Primary Examiner* — Glenford J Madamba
(74) *Attorney, Agent, or Firm* — Cantor Colburn LLP; Kurt Goudy

(57) ABSTRACT

Systems, methods, and computer program products are disclosed for dynamically determining an optimal node of an overlay network for client attachment. An optimal node can be selected from a group of potential attachment nodes in the overlay network through which a client can establish a connection to the overlay network. Network parameter training data can be determined and used to train a network optimization model. Once trained, the network optimization model can be used to determine—based on network parameter data associated with the group of potential attachment nodes—the optimal node for the client to attach to. If a different node than a current attachment node is determined to be a new optimal node, a connection path can be established between this new optimal node and the client, and an existing connection path between the client and the previous optimal node can be terminated or simultaneously maintained.

20 Claims, 6 Drawing Sheets

CLIENT ATTACHMENT TO AN OVERLAY NETWORK

STATEMENT REGARDING FEDERALLY SPONSORED RESEARCH

This invention was made with Government support under Contract No.: W911NF-06-3-0001 (1L) awarded by Army Research Office (ARO). The Government has certain rights in this invention.

BACKGROUND

The present invention relates to overlay networks, and more specifically, to client attachment to nodes of an overlay network.

An overlay network is a computer network that is built on top of another network. Nodes in the overlay network can be connected via virtual or logical links. Each such virtual or logical link can correspond to a path—potentially containing multiple physical links—through the underlying network. For example, distributed systems such as peer-to-peer networks and client-server applications can be considered overlay networks because their nodes run on top of the Internet infrastructure. Overlay networking allows for layers of network abstraction to be created that can be used to run multiple, separate, and discrete virtualized network layers on top of a physical network, and thus, can provide increased flexibility and security over the physical network alone.

SUMMARY

In one or more example embodiments of the invention, a computer-implemented method for attachment of a client to a node of an overlay network is disclosed. The method includes determining network parameter training data associated with the overlay network, and training a network optimization model based at least in part on the network parameter training data to obtain a trained network optimization model. The method further includes determining network parameter data associated with a group of potential attachment nodes of the overlay network, and selecting, using the trained network optimization model and based at least in part on the network parameter data, the node from the group of potential attachment nodes. The method additionally includes provisioning a connection path between the client and the selected node.

In one or more other example embodiments of the invention, a system for attachment of a client to a node of an overlay network is disclosed. The system includes at least one memory storing computer-executable instructions and at least one processor configured to access the at least one memory and execute the computer-executable instructions to perform a set of operations. The operations include determining network parameter training data associated with the overlay network, and training a network optimization model based at least in part on the network parameter training data to obtain a trained network optimization model. The operations further include determining network parameter data associated with a group of potential attachment nodes of the overlay network, and selecting, using the trained network optimization model and based at least in part on the network parameter data, the node from the group of potential attachment nodes. The operations additionally include provisioning a connection path between the client and the selected node.

In one or more other example embodiments of the invention, a computer program product for attachment of a client to a node of an overlay network is disclosed. The computer program product includes a computer-readable storage medium having program instructions embodied therewith, the program instructions executable by a processing circuit to cause the processing circuit to perform a method. The method includes determining network parameter training data associated with the overlay network, and training a network optimization model based at least in part on the network parameter training data to obtain a trained network optimization model. The method further includes determining network parameter data associated with a group of potential attachment nodes of the overlay network, and selecting, using the trained network optimization model and based at least in part on the network parameter data, the node from the group of potential attachment nodes. The method additionally includes provisioning a connection path between the client and the selected node.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of example embodiments of the invention and shall not be deemed to limit the breadth, scope, or applicability of embodiments of the invention. In the drawings, the left-most digit(s) of a reference numeral identifies the drawing in which the reference numeral first appears. The use of the same reference numerals indicates similar, but not necessarily the same or identical components. However, different reference numerals can be used to identify similar components as well. Various embodiments may or may not utilize elements or components other than those illustrated in the drawings, and some elements and/or components may or may not be present in various embodiments. The use of singular terminology to describe a component or element can, depending on the context, encompass a plural number of such components or elements and vice versa.

DETAILED DESCRIPTION

Overview

Figure 1:
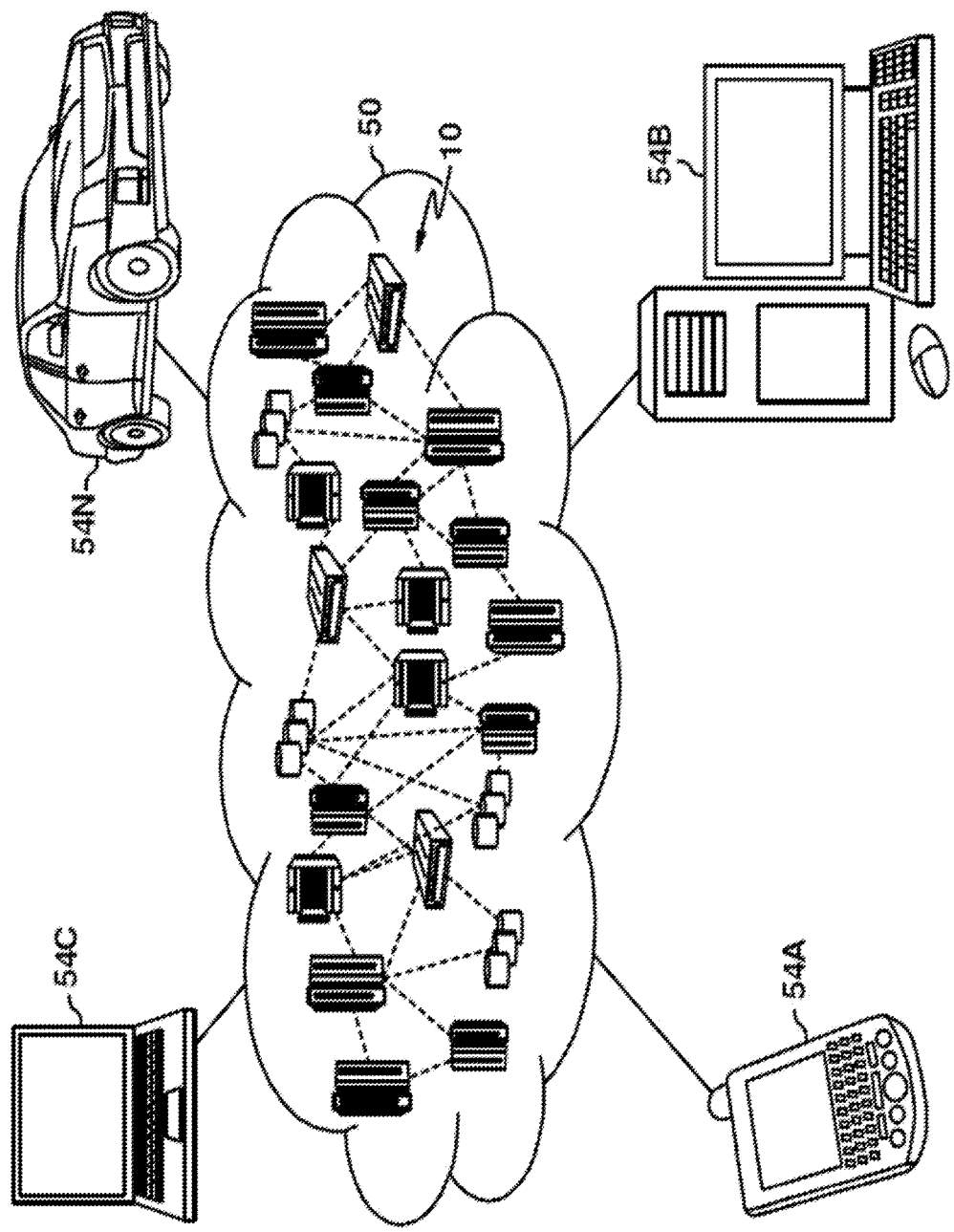
FIG. 1 depicts a cloud computing environment in accordance with one or more example embodiments of the invention.

Example embodiments of the invention include, among other things, systems, methods, computer-readable media, techniques, and methodologies for dynamically determining an optimal node of an overlay network for client attachment. An optimal node can be selected from among a group of potential attachment nodes in the overlay network through which a client can establish a connection to the overlay network. Network parameter training data can be determined and used to train a network optimization model. The training data can include, for example, network connection metrics associated with connections between the client and the nodes of the overlay network. The network optimization model can be, for example, a machine learning algorithm.

Once trained, the network optimization model can be used to determine—based at least in part on network parameter data associated with the group of potential attachment nodes—the optimal node for the client to attach to. Use of the network optimization model to select the optimal node can include determining that network parameter data associated with the optimal node satisfies one or more optimization/selection criteria. A connection path between the client and the optimal node can then be provisioned. Data traffic to and from the client can then occur through the overlay network via the connection path formed as a result of attachment of the client to the node that was determined to be the optimal node for connecting the client to the overlay network.

The optimal node for a client to attach to can change over time. For instance, as network characteristics change over time, a different node in the overlay network can exhibit network characteristics that are more optimal than a node that a client is currently attached to. Additionally, or alternatively, the current attachment node can exhibit a change in network characteristics that causes it to no longer satisfy minimum selection criteria. If a different node than a current attachment node is determined to be a new optimal node, a connection path can be established between this new optimal node and the client, and optionally, the existing connection path between the client and the previous optimal node can be terminated. Alternatively, connection paths can be simultaneously maintained between the client and multiple attachment nodes of the overlay network such that data traffic can occur to/from the client over the overlay network at least partially concurrently via multiple connection paths.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
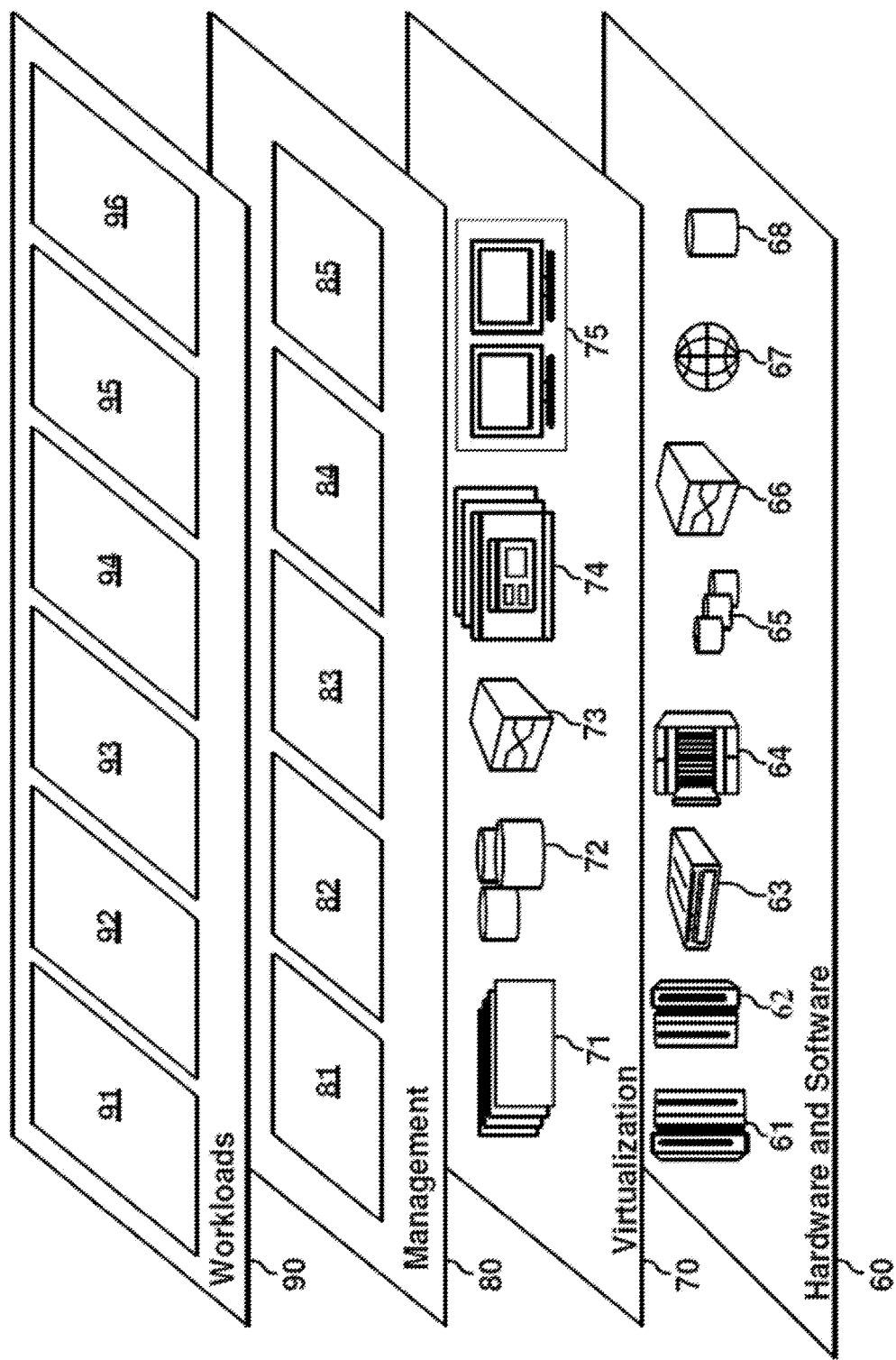
FIG. 2 depicts abstraction model layers in accordance with one or more example embodiments of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and photograph sharing 96.

Example Embodiments

Figure 3:
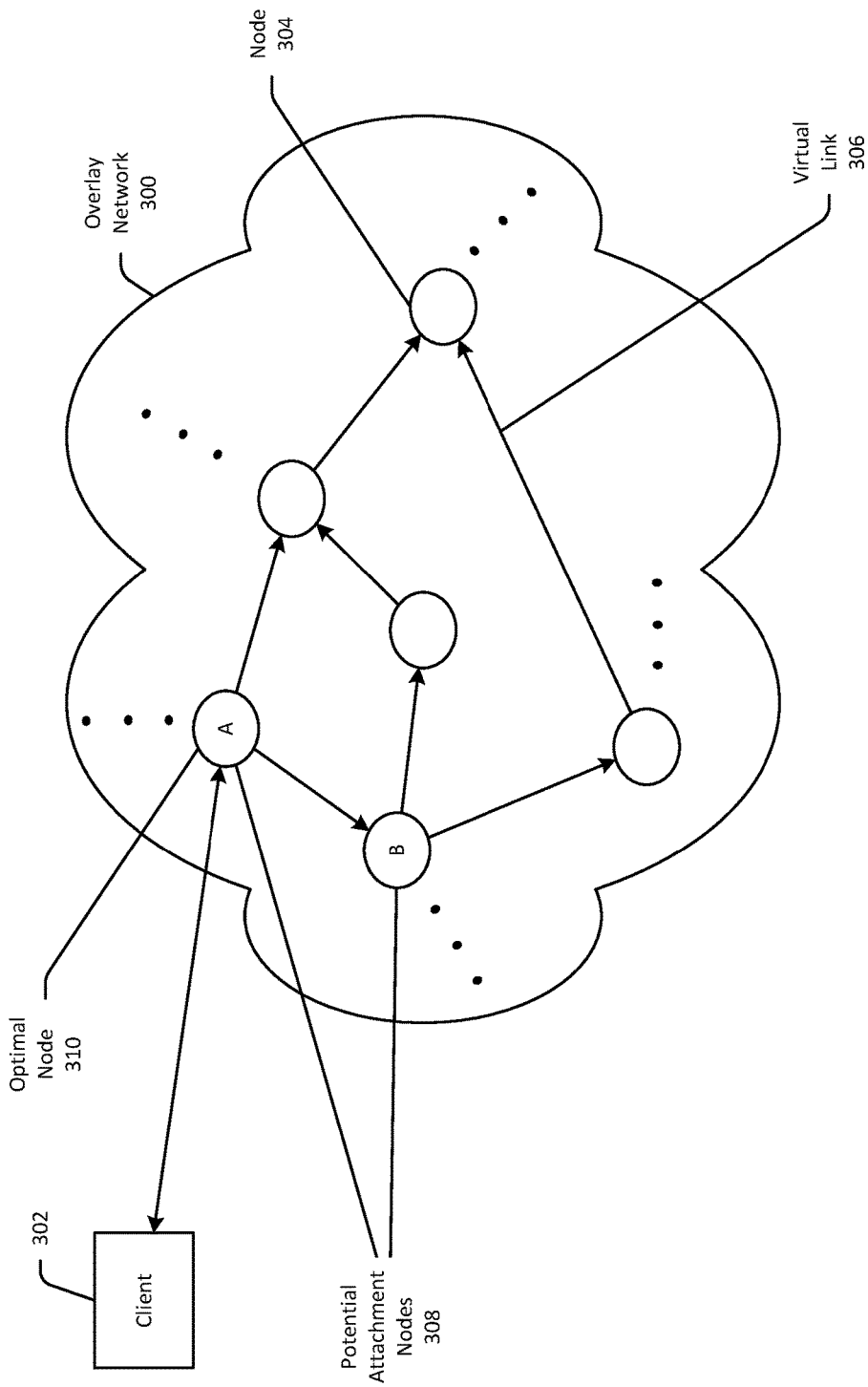
FIG. 3 schematically depicts client attachment to an optimal node of an overlay network in accordance with one or more example embodiments of the invention.
Figure 4:
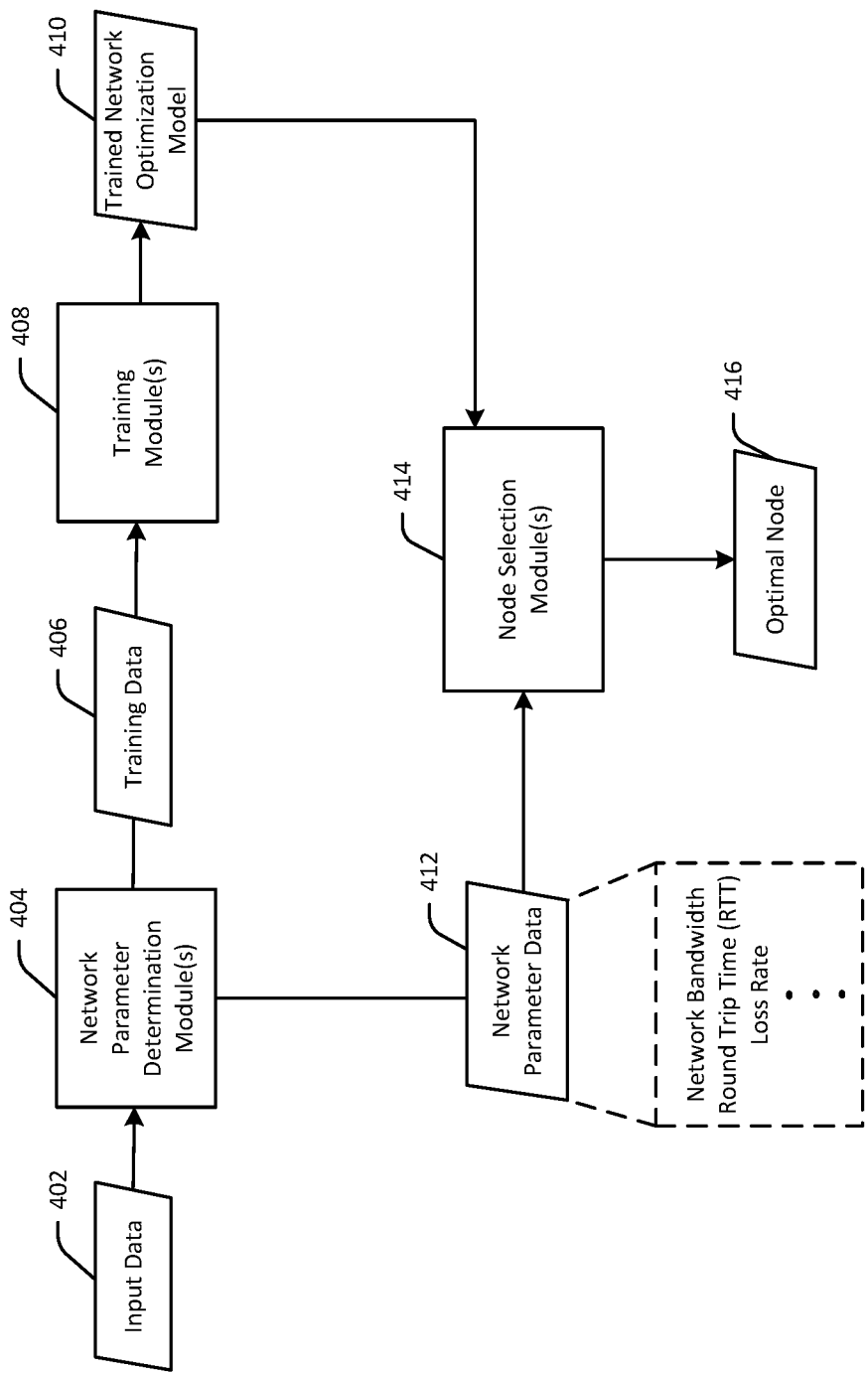
FIG. 4 is a schematic block diagram of illustrative components configured to determine an optimal node of an overlay network for client attachment in accordance with one or more example embodiments of the invention.
Figure 5:
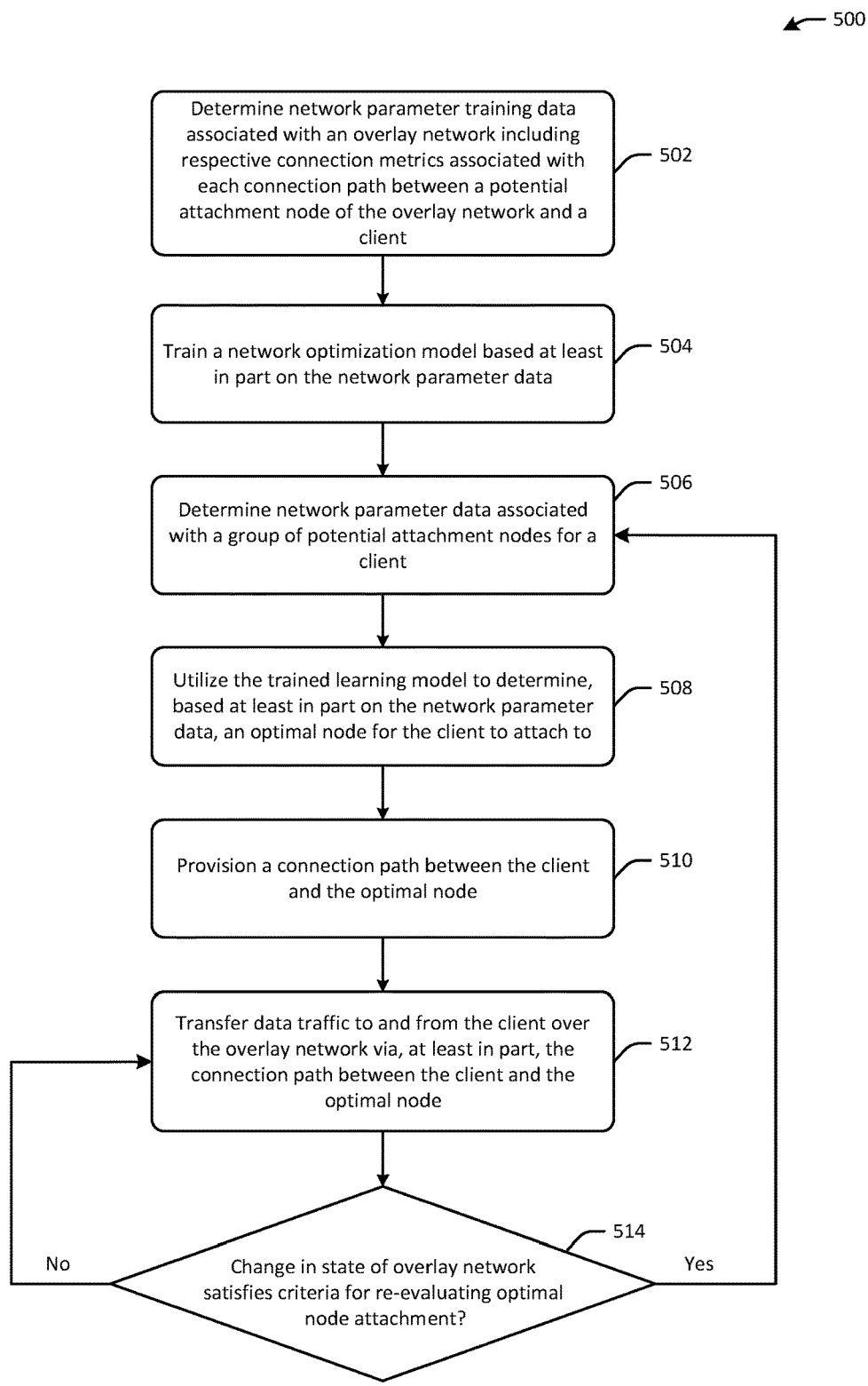
FIG. 5 is a process flow diagram of an illustrative method for determining an optimal node of an overlay network for client attachment in accordance with one or more example embodiments of the invention.

FIG. 3 schematically depicts client attachment to an optimal node of an overlay network. FIG. 4 is a schematic block diagram of illustrative components configured to determine an optimal node of an overlay network for client attachment. FIG. 5 is a process flow diagram of an illustrative method for determining an optimal node of an overlay network for client attachment in accordance with one or more example embodiments of the invention. FIG. 3-5 will be described in conjunction with one another hereinafter.

Each operation of the method 500 can be performed by one or more of the program modules depicted in FIG. 4 or FIG. 6, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. A system or device described herein as being configured to implement example embodiments of the invention can include one or more processing circuits, each of which can include one or more processing units or nodes. Computer-executable instructions can include computer-executable program code that when executed by a processing unit can cause input data contained in or referenced by the computer-executable program code to be accessed and processed to yield output data.

Referring first to FIG. 3, an example overlay network 300 is depicted that includes a plurality of interconnected nodes 304. The overlay network 300 can include virtual links 306 between the nodes 304. The overlay network 300 can rely on one or more underlying physical networks to transmit data over the overlay network 300. As such, a virtual link 306 between two interconnected nodes 304 of the overlay network 300 can correspond to any number of underlying physical network links.

The overlay network 300 can provide improved performance over default Internet routing by creating alternative network paths between nodes of the overlay network 300 and redirecting data packets through these alternative network paths. The alternative network paths of the overlay network 300 can be paths formed via the virtual links 306 between the nodes 304. By redirecting data packets onto alternative paths over the overlay network 300 that exhibit improved performance characteristics over the physical network routing, the amount of time that a client has to wait to receive a response from a server over a network can be reduced, and thus, application performance can be improved. It can be advantageous to implement a cloud network such as that depicted in FIG. 1 as the overlay network 300 because cloud networks are typically better provisioned and have lower congestion than standard Internet networks.

For many overlay networks (e.g., cloud networks), the available bandwidth within the overlay network is significantly higher than what is available over standard Internet network paths. As such, the overlay network 300 itself cannot be the limiting factor in network performance. Rather, the overhead associated with establishing a connection between a client 300 and a node 304 of the overlay network 300 over a standard Internet path can be a primary limiting factor due to congestion at the attachment node. In particular, a key drawback with existing overlay networks is determining, for a client at an arbitrary point in the Internet, which node the client should attach to in order to provide the most optimal performance characteristics for data traffic to/from the client over the overlay network. Example embodiments of the invention address this and other drawbacks associated with existing overlay networks by algorithmically determining an optimal node in an overlay network for a client to attach to that minimizes overhead associated with establishing a connection between the client and the node and provides optimized performance characteristics for the client over the overlay network.

Referring now to FIGS. 3-5 in conjunction with one another, at block 502 of the 500, computer-executable instructions of one or more network parameter determination modules 404 can be executed to determine network parameter training data 406 associated with the overlay network 300. The network parameter training data 406 can include, for example, respective connection metrics associated with each potential connection path between a potential attachment node 308 of the overlay network 300 and the client 302. The respective connection metrics for each such potential connection path between the client 302 and a corresponding potential attachment node 308 can relate one or more network parameters including, without limitation, network bandwidth of the connection path; round trip time (RTT) between the client 302 and the potential attachment node 308; data loss rate; time of day; and so forth. The network parameter training data 406 can further include data indicative of how one connection metric varies with another connection metric. For example, the network parameter training data 406 can include data indicative of how bandwidth, RTT, or the like varies over the course of a day, week, etc.

In certain example embodiments, the network parameter determination module(s) 404 can be configured to measure various connection metrics to generate, at least in part, the network parameter training data 406. In other example embodiments, the network parameter determination module(s) 404 can receive input data 402 indicative of at least some of the connection metrics. In addition, the input data 402 can include data received from other sources, which can then be included among the training data 406. For example, the input data 402 can include geo-location data indicative of a location of the client 302 and/or respective locations for the potential attachment nodes 308. The input data 402 can further include routing information such as routing and peering relationships associated with the overlay network 300 and/or one or more underlying physical networks; identification of a carrier network of the client 302; identification of one or more carrier networks associated with the overlay network 300; identification of one or more carrier networks between the client 302 of the overlay network 300; attributes of any of the aforementioned carrier networks; and so forth. The input data 402 can additionally include data indicative of costs/cost models associated with using various carrier networks/resources (e.g., fixed costs, overage costs, bulk discounts, tiered pricing, etc.). It should be appreciated that the example types of input data 402 and training data 406 described above are merely illustrative and not exhaustive.

Referring again to FIG. 5, at block 504 of the method 500, computer-executable instructions of one or more training modules 408 can be executed to train a network optimization model based at least in part on the training data 406 to obtain a trained network optimization model 410. The network optimization model can be a machine learning algorithm, a statistical correlation algorithm, a regression analysis, a graph algorithm, or the like. Training the network optimization model can include providing the training data 406 as ground truth data to the model to obtain the trained network optimization model 410, which can then be used to determine an optimal attachment node 310 for the client 302 based at least in part on dynamically changing network parameter data 412. In certain example embodiments, the trained network optimization model 410 can be thought of as a scoring mechanism that assigns a respective score to each potential attachment node 308 and selects the potential attachment node 308 having a score that indicates the most optimal performance characteristics as the optimal node 310.

More specifically, at block 506 of the method 500, computer-executable instructions of the network parameter determination module(s) 404 can be executed to determine network parameter data 412 associated with the potential attachment nodes 308. The network parameter data 412 can include similar types of performance or other data as described above in connection with the training data 408. The network parameter data 412 can be dynamically generated/obtained on a periodic basis.

At block 508 of the method 500, computer-executable instructions of one or more node selection modules 414 can be executed to utilize the trained network optimization model 410 to determine, based at least in part on the network parameter data 412, an optimal node 416 for the client 302 to attach to. The optimal node 416 can correspond to the optimal node 310 depicted in FIG. 3. For example, as previously noted, the trained network optimization model 410 can assign a score to each potential attachment node 308 based at least in part on respective network parameter data 412. The trained network optimization model 410 can then select the potential attachment node 308 having a score indicative of the most optimal performance characteristics among all potential attachment nodes 308 as the optimal node 310.

In certain example embodiments, the trained network optimization model 410 can select the optimal node 416 based at least in part on one or more optimization criteria. For example, the trained network optimization model 410 can select the potential attachment node 308 associated with the highest bandwidth as the optimal node 310. As another non-limiting example, the potential attachment node 308 associated with the shortest RTT or the lowest loss rate can be selected as the optimal node 310. Further, in certain example embodiments, the trained network optimization model 410 can score each potential attachment node 308 based at least in part on a weighted combination of multiple connection metrics and/or other network parameters (e.g., the type of carrier network and/or its attributes; cost models; etc.). For example, the trained network optimization model 410 can assign respective weights to the bandwidth and loss rate connection metrics as part of scoring each potential attachment node 308 and ultimately determining the optimal node 310.

In certain example embodiments, the trained network optimization model 410 can establish certain minimum/maximum thresholds that must be satisfied in order for a potential attachment node 308 to be considered a candidate for selection as the optimal node 310. For example, if a potential attachment node 308 does not have a minimum amount of bandwidth, exceeds a maximum RTT, exceeds a maximum loss rate, or the like, the potential attachment node 308 can be excluded from consideration for selection as the optimal node 310. Further, in certain example embodiments, the trained network optimization model 410 can select a potential attachment node 308 as the optimal node 310 if one or more connection metrics satisfy certain thresholds. For example, if a potential attachment node 308 has a bandwidth that meets a certain threshold value, it can be selected as the optimal node 310. As such, it should be appreciated that, in certain example embodiments, multiple potential attachment nodes 308 can be selected as optimal nodes 310 such that a respective connection path between the client 302 and each such optimal node 310 can be established and data traffic can flow along multiple connection paths at least partially concurrently.

Referring again to FIG. 5, at block 510 of the method 500, a connection path between the client 302 and the optimal node 310 can be provisioned. Then, at block 512 of the method 500, data traffic can be transferred to and from the client 302 over the overlay network 300 via, at least in part, the connection path that is established between the client 302 of the optimal node 310.

At block 514 of the method 500, computer-executable instructions of the node selection module(s) 414 can be executed to determine that a change in a state of the overlay network 300 satisfies criteria for re-evaluating optimal node attachment. More specifically, the node selection module(s) 414 can determine, at block 514, that network performance characteristics of the overlay network 300 have changed so as to necessitate a re-evaluation of the appropriate optimal node(s) to which client 302 should attach.

In response to a negative determination at block 514, the method 500 can continue with block 512 and data traffic can be transmitted to/from the client 302 over the overlay network 300 via the client's 302 attachment to the existing optimal node 310. Alternatively, in response to a positive determination at block 514, the method 500 can proceed from block 506, at which point, updated network parameter data 412 can be generated/obtained by the network parameter determination module(s) 404. The trained network optimization model 410 can then be applied to the updated network parameter data 412 at block 508 to determine that a new potential attachment node 308 has become a more optimal node for attachment of the client 302. If the trained network optimization model 412 identifies a new optimal node or optimal nodes, a connection path between the client 302 and the new optimal node(s) can be established at block 510 of the method 500. It should be appreciated that, in certain example embodiments, the network parameter data 412 can be periodically updated, in which case, the periodically updated network parameter data 412 can be evaluated at block 514 of the method 500 to determine that a state of the overlay network 300 has changed to such a degree so as to trigger re-evaluation of the optimal node.

Example embodiments of the invention provide various technical features, technical effects, and/or improvements to technology. For instance, example embodiments of the invention provide the technical effect of improving performance characteristics of an overlay network. This technical effect is achieved at least in part by the technical features described herein for determining an optimal node for a client to attach to the overlay network such that connection overhead is minimized and performance parameters are optimized. The above-mentioned technical effects and technical features yield an improvement to computer technology. In particular, the technical aspects of embodiments of the invention yield an improvement to overlay computer network technology by providing an improved algorithmic decision-making process for determining an optimal node of an overlay network for a client to attach to. It should be appreciated that the above examples of technical features, technical effects, and improvements to the functioning of a computer and computer technology provided by example embodiments of the invention are merely illustrative and not exhaustive.

One or more illustrative embodiments of the invention are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
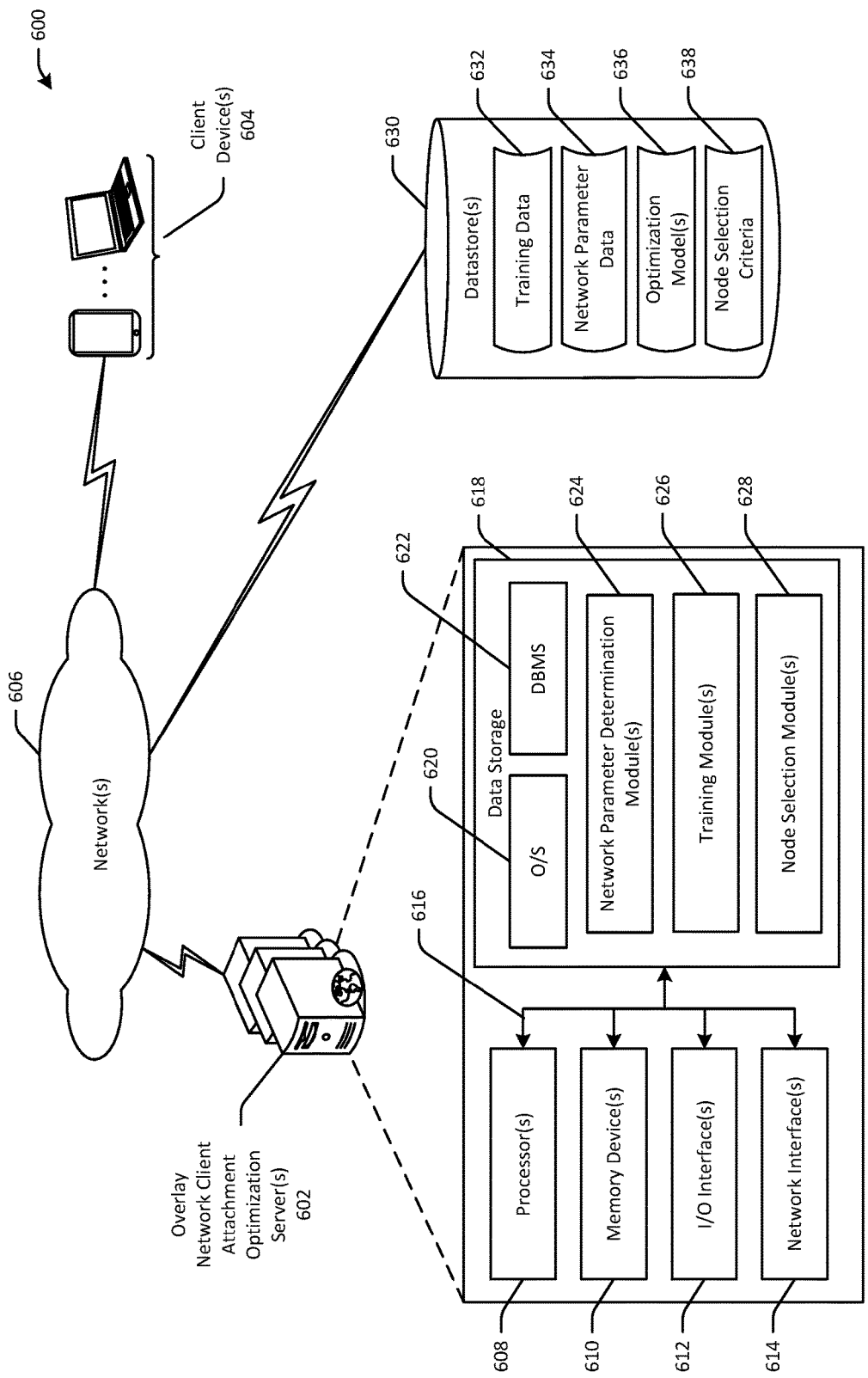
FIG. 6 is a schematic diagram of an illustrative networked architecture configured to implement one or more example embodiments of the invention.

FIG. 6 is a schematic diagram of an illustrative networked architecture 600 configured to implement one or more example embodiments of the invention. The networked architecture 600 can include one or more overlay network client attachment servers 602 and one or more client devices 604 communicatively coupled via one or more networks 606. The network(s) 606 can include, for example, the overlay network 302 depicted in FIG. 3. While the server(s) 602 and/or the client device(s) 604 are described herein in the singular at times, it should be appreciated that multiple instances of such devices can be provided and functionality described in connection with the server 602 and/or the client device 604 can be distributed across such multiple instances. The server 602 can be configured to implement any of the functionality described earlier in this disclosure. Further, in certain example embodiments, functionality described herein can be distributed among the server 602 and a client device 604.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 602 can include one or more processors (processor(s)) 608, one or more memory devices 610 (generically referred to herein as memory 610), one or more input/output ("I/O") interface(s) 612, one or more network interfaces 614, and data storage 618. The server 602 can further include one or more buses 616 that functionally couple various components of the server 602.

The bus(es) 616 can include at least one of a system bus, a memory bus, an address bus, or a message bus, and can permit the exchange of information (e.g., data (including computer-executable code), signaling, etc.) between various components of the device 400. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein.

The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620; one or more database management systems (DBMS) 622 configured to access the memory 610 and/or one or more external data store(s) 630 (potentially via a network 606); and one or more program modules, applications, engines, computer-executable code, scripts, or the like such as, for example, one or more network parameter determination modules 624, one or more training modules 626, and one or more node selection modules 628. Any of these modules can, in turn, include various sub-modules. Any of the components depicted as being stored in data storage 618 can include any combination of software, firmware, and/or hardware. The software and/or firmware can include computer-executable instructions (e.g., computer-executable program code) that can be loaded into the memory 610 for execution by one or more of the processor(s) 608 to perform any of the operations described earlier in connection with correspondingly named modules depicted in FIG. 4.

Although not depicted in FIG. 6, the data storage 618 can further store various types of data utilized by components of the server 602 (e.g., any of the data shown as being stored in the data store(s) 630). Any data stored in the data storage 618 can be loaded into the memory 610 for use by the processor(s) 608 in executing computer-executable instructions. In addition, any data stored in the data storage 618 can potentially be stored in the data store(s) 630 and can be accessed via the DBMS 622 and loaded in the memory 610 for use by the processor(s) 608 in executing computer-executable instructions.

The processor(s) 608 can be configured to access the memory 610 and execute computer-executable instructions loaded therein. For example, the processor(s) 608 can be configured to execute computer-executable instructions of the various program modules, applications, engines, or the like of the server 602 to cause or facilitate various operations to be performed in accordance with one or more example embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the server 602 and hardware resources of the server 602. More specifically, the O/S 620 can include a set of computer-executable instructions for managing hardware resources of the server 602 and for providing common services to other application programs. In certain example embodiments, the O/S 620 can include or otherwise control execution of one or more of the program modules depicted as being stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in the external data store(s) 630. The DBMS 622 can use any of a variety of database models (e.g., relational model, object model, etc.) and can support any of a variety of query languages. The DBMS 622 can access data represented in one or more data schemas and stored in any suitable data repository. The data store(s) 630 can store training data 632 (which can include any of the types of data described in reference to the training data 406), network parameter data 634 (which can include any of the types of network parameter data 412 previously described), one or more optimization model 636 (which can include the trained network optimization model 410); and node selection criteria 638 (which can include any of the types of optimization criteria/ thresholds utilized by the node selection module(s) 628 to determine the optimal node 416). The data store(s) 630, which can be accessible by the server 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the server 602, the input/output (I/O) interface(s) 612 can facilitate the receipt of input information by the server 602 from one or more I/O devices as well as the output of information from the server 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the server 602 or can be separate. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 602 can further include one or more network interfaces 614 via which the server 602 can communicate with any of a variety of other systems, platforms, networks, devices, and so forth. The network interface(s) 614 can enable communication, for example, with one or more other devices via one or more of the network(s) 606.

It should be appreciated that the program modules depicted in FIG. 6 as being stored in the data storage 618 are merely illustrative and not exhaustive and that processing described as being supported by any particular module can alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the server 602 and/or hosted on other computing device(s) (e.g., the client device 604) accessible via one or more of the network(s) 606, can be provided to support functionality provided by the modules depicted in FIG. 6 and/or additional or alternate functionality. Further, functionality can be modularized in any suitable manner such that processing described as being performed by a particular module can be performed by a collection of any number of program modules, or functionality described as being supported by any particular module can be supported, at least in part, by another module. In addition, program modules that support the functionality described herein can be executable across any number of servers 602 and/or client devices 604 in accordance with any suitable computing model such as, for example, a client-server model, a peer-to-peer model, and so forth. In addition, any of the functionality described as being supported by any of the modules depicted in FIG. 6 can be implemented, at least partially, in hardware and/or firmware across any number of devices or servers.

It should further be appreciated that the server 602 can include alternate and/or additional hardware, software, or firmware components beyond those described or depicted without departing from the scope of the disclosure. More particularly, it should be appreciated that software, firmware, or hardware components depicted as forming part of the server 602 are merely illustrative and that some components may or may not be present or additional components can be provided in various embodiments. While various illustrative modules have been depicted and described as software modules stored in data storage 618, it should be appreciated that functionality described as being supported by the modules can be enabled by any combination of hardware, software, and/or firmware. It should further be appreciated that each of the above-mentioned modules can, in various embodiments, represent a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular module can, in various embodiments, be provided at least in part by one or more other modules. Further, one or more depicted modules may or may not be present in certain embodiments, while in other embodiments, additional program modules and/or engines not depicted can be present and can support at least a portion of the described functionality and/or additional functionality.

One or more operations of the method 500 can be performed by a server 602 having the illustrative configuration depicted in FIG. 6, or more specifically, by one or more program modules, engines, applications, or the like executable on such a device. It should be appreciated, however, that such operations can be implemented in connection with numerous other device configurations. In addition, any of the functionality described in connection with the server 602 can be provided, at least in part, by one or more of the client devices 604.

The operations described and depicted in the illustrative method 500 of FIG. 5 can be carried out or performed in any suitable order as desired in various example embodiments of the invention. Additionally, in certain example embodiments, at least a portion of the operations can be carried out in parallel. Furthermore, in certain example embodiments, less, more, or different operations than those depicted in FIG. 5 can be performed.

Although specific embodiments of the invention have been described, one of ordinary skill in the art will recognize that numerous other modifications and alternative embodiments are within the scope of the disclosure. For example, any of the functionality and/or processing capabilities described with respect to a particular system, system component, device, or device component can be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Example embodiments of the invention can be implemented as a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for attachment of a client to a node of an overlay network, the method comprising:
   determining network parameter training data associated with the overlay network;
   training a network optimization model based at least in part on the network parameter training data;
   determining network parameter data associated with a group of potential attachment nodes of the overlay network;
   selecting, using the trained network optimization model and based at least in part on the network parameter data, the node from the group of potential attachment nodes, wherein selecting comprises excluding potential attachment nodes from the group of potential attachment nodes that respectively have a first parameter measuring below a first threshold and a second parameter measuring greater than a second threshold; and
   provisioning a connection path between the client and the selected node.

2. The computer-implemented method of claim 1, wherein the network optimization model comprises at least one of a machine learning algorithm, a statistical correlation algorithm, regression analysis, and a graph algorithm.

3. The computer-implemented method of claim 1, wherein the network parameter data comprises a respective set of one or more connection metrics measured with respect to the client and each potential attachment node, and wherein each respective set of one or more connection metrics relates to a set of one or more network parameters comprising at least one of network bandwidth, round trip time, loss rate, and time of day.

4. The computer-implemented method of claim 3, wherein the network parameter data further comprises geo-location data indicating a respective location of the client and each of the potential attachment nodes.

5. The computer-implemented method of claim 1, wherein the node is a first node of the overlay network and the connection path is a first connection path, the method further comprising:
   selecting, using the trained network optimization model and based at least in part on the network parameter data, a second node from among the group of potential attachment nodes; and
   provisioning a second connection path between the client and the second node,
   wherein data transfer between the client and the first node via the first connection path occurs at least partially concurrently with data transfer between the client and the second node.

6. The computer-implemented method of claim 1, wherein the node is a first node and the connection path is a first connection path, the method further comprising:
   determining that a change in a state of the overlay network satisfies criteria for re-evaluating which node of the overlay network the client should attach to;
   determining updated network parameter data associated with the group of potential attachment nodes;
   selecting, using the trained network optimization model and based at least in part on the network parameter data, a second node from among the group of potential attachment nodes;
   terminating the connection path between the client and the first node; and
   provisioning a second connection path between the client and the second node.

7. The computer-implemented method of claim 1, wherein selecting the node from among the group of potential attachment nodes comprises applying the trained network optimization model to the network parameter data to determine that the node satisfies one or more optimization criteria.

8. A system for attachment of a client to a node of an overlay network, the system comprising:
   at least one memory storing computer-executable instructions; and
   at least one processor configured to access the at least one memory and execute the computer-executable instructions to:
   determine network parameter training data associated with the overlay network;
   train a network optimization model based at least in part on the network parameter training data;
   determine network parameter data associated with a group of potential attachment nodes of the overlay network;
   select, using the trained network optimization model and based at least in part on the network parameter data, the node from the group of potential attachment nodes, wherein selecting comprises excluding potential attachment nodes from the group of potential attachment nodes that respectively have a first parameter measuring below a first threshold and a second parameter measuring greater than a second threshold; and
   provision a connection path between the client and the selected node.

9. The system of claim 8, wherein the network optimization model comprises at least one of a machine learning algorithm, a statistical correlation algorithm, regression analysis, and a graph algorithm.

10. The system of claim 8, wherein the network parameter data comprises a respective set of one or more connection metrics measured with respect to the client and each potential attachment node, and wherein each respective set of one or more connection metrics relates to a set of one or more network parameters comprising at least one of network bandwidth, round trip time, loss rate, and time of day.

11. The system of claim 10, wherein the network parameter data further comprises geo-location data indicating a respective location of the client and each of the potential attachment nodes.

12. The system of claim 8, wherein the node is a first node of the overlay network and the connection path is a first connection path, and wherein the at least one processor is further configured to execute the computer-executable instructions to:

select, using the trained network optimization model and based at least in part on the network parameter data, a second node from among the group of potential attachment nodes; and provision a second connection path between the client and the second node, wherein data transfer between the client and the first node via the first connection path occurs at least partially concurrently with data transfer between the client and the second node.

13. The system of claim 8, wherein the node is a first node and the connection path is a first connection path, and wherein the at least one processor is further configured to execute the computer-executable instructions to:

determine that a change in a state of the overlay network satisfies criteria for re-evaluating which node of the overlay network the client should attach to;

determine updated network parameter data associated with the group of potential attachment nodes;

select, using the trained network optimization model and based at least in part on the network parameter data, a second node from among the group of potential attachment nodes;

terminate the connection path between the client and the first node; and provision a second connection path between the client and the second node.

14. The system of claim 8, wherein the at least one processor is configured to select the node from among the group of potential attachment nodes by executing the computer-executable instructions to apply the trained network optimization model to the network parameter data to determine that the node satisfies one or more optimization criteria.

15. A computer program product for attachment of a client to a node of an overlay network, the computer program product comprising a computer-readable storage medium having program instructions embodied therewith, the program instructions executable by a processing circuit to cause the processing circuit to perform a method comprising:

determining network parameter training data associated with the overlay network;

training a network optimization model based at least in part on the network parameter training data;

determining network parameter data associated with a group of potential attachment nodes of the overlay network;

selecting, using the trained network optimization model and based at least in part on the network parameter data, the node from the group of potential attachment nodes, wherein selecting comprises excluding potential attachment nodes from the group of potential attachment nodes that respectively have a first parameter measuring below a first threshold and a second parameter measuring greater than a second threshold; and provisioning a connection path between the client and the selected node.

16. The computer program product of claim 15, wherein the network parameter data comprises a respective set of one or more connection metrics measured with respect to the client and each potential attachment node, and wherein each respective set of one or more connection metrics relates to a set of one or more network parameters comprising at least one of network bandwidth, round trip time, loss rate, and time of day.

17. The computer program product of claim 16, wherein the network parameter data further comprises geo-location data indicating a respective location of the client and each of the potential attachment nodes.

18. The computer program product of claim 15, wherein the node is a first node of the overlay network and the connection path is a first connection path, the method further comprising:

selecting, using the trained network optimization model and based at least in part on the network parameter data, a second node from among the group of potential attachment nodes; and provisioning a second connection path between the client and the second node, wherein data transfer between the client and the first node via the first connection path occurs at least partially concurrently with data transfer between the client and the second node.

19. The computer program product of claim 15, wherein the node is a first node and the connection path is a first connection path, the method further comprising:

determining that a change in a state of the overlay network satisfies criteria for re-evaluating which node of the overlay network the client should attach to;

determining updated network parameter data associated with the group of potential attachment nodes;

selecting, using the trained network optimization model and based at least in part on the network parameter data, a second node from among the group of potential attachment nodes;

terminating the connection path between the client and the first node; and provisioning a second connection path between the client and the second node.

20. The computer program product of claim 15, wherein selecting the node from among the group of potential attachment nodes comprises applying the trained network optimization model to the network parameter data to determine that the node satisfies one or more optimization criteria.

* * * * *